US012775415B2

(12) United States Patent
Colella et al.

(10) Patent No.: US 12,775,415 B2
(45) Date of Patent: Oct. 27, 2026

(54) COLD AND HOT REGION DETECTION FOR A MEMORY SYSTEM

(71) Applicant: Micron Technology, Inc., Boise, ID (US)

(72) Inventors: Nicola Colella, Capodrise (IT); Alessandro Novati, Verano Brianza (IT); Federico Amedeo Izzo, Milan (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/221,085

(22) Filed: May 28, 2025

(65) Prior Publication Data

US 2025/0383809 A1 Dec. 18, 2025

Related U.S. Application Data

(60) Provisional application No. 63/659,447, filed on Jun. 13, 2024.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 11,579,792 | B2 * | 2/2023 | Teranishi | G06F 3/064 |
| 2013/0290598 | A1 * | 10/2013 | Fiske | G06F 3/0625<br>711/E12.008 |
| 2020/0327069 | A1 * | 10/2020 | Kang | G06F 12/0246 |
| 2025/0103208 | A1 * | 3/2025 | Liu | G06F 3/061 |

* cited by examiner

*Primary Examiner* — Khoa D Doan
(74) *Attorney, Agent, or Firm* — Holland & Hart LLP

(57) ABSTRACT

Methods, systems, and devices for cold and hot region detection are described. A memory system may maintain access counters within a tiered structure, where the access counters indicate quantities of access operations in each of multiple different levels of memory regions. For example, the memory system may maintain a first counter that indicates a quantity of access operations at a first memory region corresponding to a first size. The memory system may determine that the first counter satisfies a threshold, and the memory system may initiate a second set of counters that indicate respective quantities of access operations in respective subsets of the first memory region. The second set of counters may each correspond to second memory regions corresponding to a second size that is less than the first size, and each of the second memory regions may be a subset of the first memory region.

22 Claims, 7 Drawing Sheets

COLD AND HOT REGION DETECTION FOR A MEMORY SYSTEM

CROSS REFERENCE

The present Application for Patent claims priority to U.S. Patent Application No. 63/659,447 by Colella et al., entitled "COLD AND HOT REGION DETECTION FOR A MEMORY SYSTEM," filed Jun. 13, 2024, which is assigned to the assignee hereof, and which is expressly incorporated by reference in its entirety herein.

TECHNICAL FIELD

The following relates to one or more systems for memory, including cold and hot region detection.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
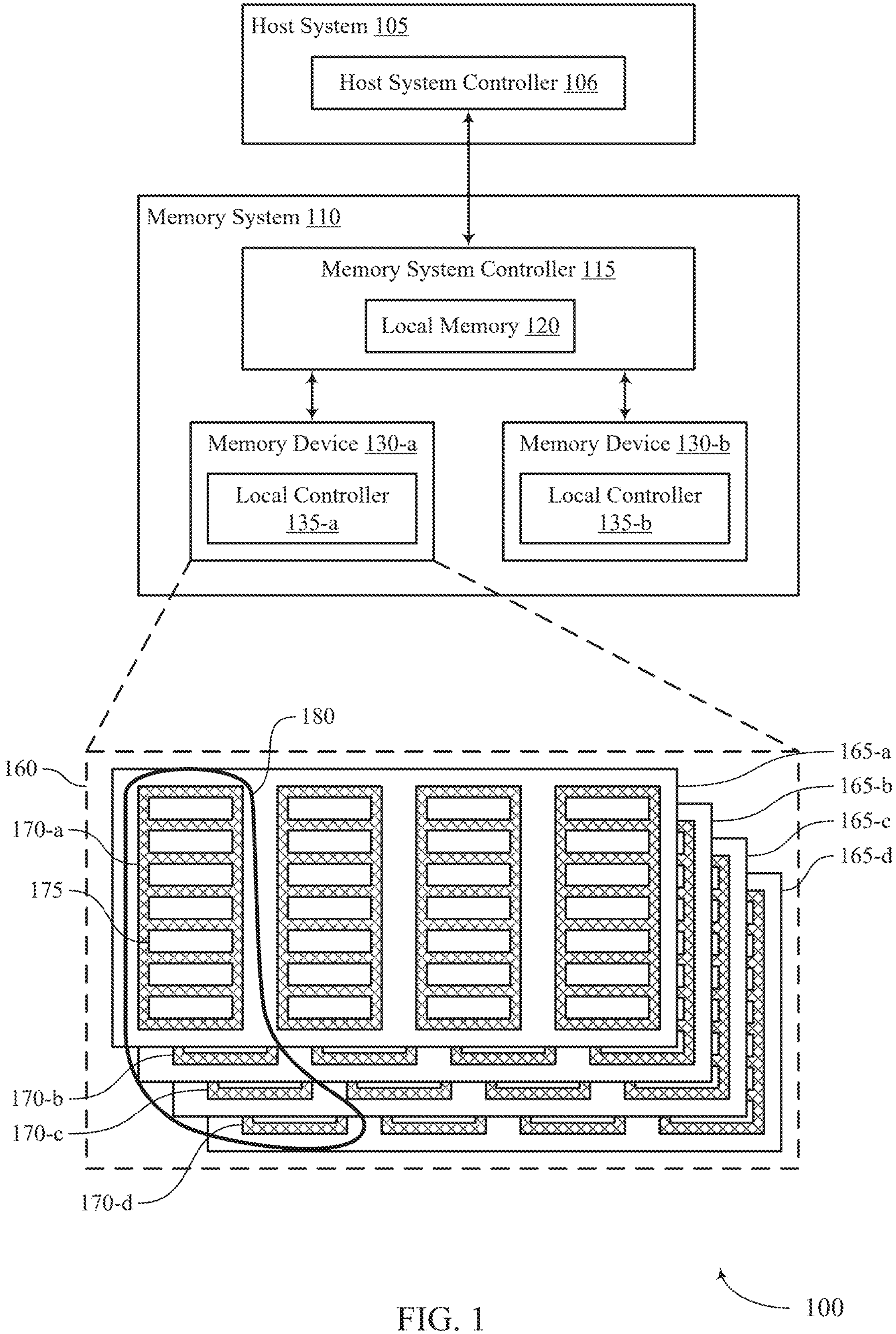
FIG. 1 shows an example of a system that supports cold and hot region detection in accordance with examples as disclosed herein.

A memory system may include a set of virtual blocks associated with storing data. The memory system may perform maintenance operations (e.g., garbage collection operations) on the virtual blocks to move valid data to a destination block, and erase invalid or old data from the source block. In some instances, different regions of the virtual blocks may be associated with different levels of usage. Some regions of the virtual blocks may be associated with a relatively high frequency of access, and may be referred to herein as hot data, and some regions of the virtual blocks may be associated with a relatively low frequency of access, and may be referred to herein as cold data. In some cases, during garbage collection, the hot data may be overwritten, which may result in an excess quantity of write operations to continuously rewrite the hot data to a cache for access by a host system. In some examples, techniques may be performed by the memory system to separate hot data from cold data in the memory system. However, such techniques may be associated with a relatively low accuracy and imprecision for identifying hot data to separate, which may may reduce read and write performance of the memory system and increase a write amplification factor (WAF).

In accordance with examples described herein, a memory system may maintain access counters within a tiered (e.g., leveling) structure, where the access counters indicate quantities of access operations in each of multiple different levels of memory regions. For example, the memory system may maintain a first counter that indicates a quantity of access operations at a first memory region (e.g., a first level) corresponding to a first size (e.g., 1 gigabyte (GB)). The memory system may determine that the first counter satisfies a threshold, and the memory system may initiate (e.g., open, enable, trigger) a second set of counters that indicate respective quantities of access operations in respective subsets of the first memory region. That is, the second set of counters may each correspond to second memory regions (e.g., of a second level) corresponding to a second size (e.g., 256 megabyte (MB)) that is less than the first size, and each of the second memory regions may be a subset of the first memory region. By maintaining access counters in accordance with the tiered structure described herein, the memory system may perform separation of hot and cold data with increased accuracy and increased precision (e.g., at smaller granularities of data), which may result in reduced latencies, increased throughput, and a reduced WAF.

In addition to applicability in memory systems as described herein, techniques for cold and hot region detection may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices improving memory access speeds, which may decrease processing or latency times, improve response times, or otherwise improve user experience, among other benefits.

Features of the disclosure are illustrated and described in the context of systems, devices, and circuits. Features of the disclosure are further illustrated and described in the context of architectures, block diagrams, and flowcharts.

FIG. 1 shows an example of a system 100 that supports cold and hot region detection in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table (e.g., physical pointer table (PPT)) to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, a memory system 110 may include a set of virtual blocks 180 associated with storing data. The memory system 110 (e.g., a memory system controller 115) may perform maintenance operations (e.g., garbage collection operations) on the virtual blocks 180 to move valid data to a destination block, and erase invalid or old data from the source block. In some instances, different regions of the virtual blocks 180 may be associated with different levels of usage. Some regions of the virtual blocks 180 may be associated with a relatively high frequency of access, and may be referred to herein as hot data, and some regions of the virtual blocks 180 may be associated with a relatively low frequency of access, and may be referred to herein as cold data. In some cases, during garbage collection, the hot data may be overwritten, which may result in an excess quantity of write operations to continuously rewrite the hot data to a cache for access by a host system 105. In some examples, techniques may be performed by the memory system 110 to separate hot data from cold data in the memory system 110. However, such techniques may be associated with a relatively low accuracy and imprecision in identifying hot data to be separated, which may reduce read and write performance of the memory system 110 and increase a write amplification factor (WAF).

In accordance with examples described herein, a memory system 110 may maintain access counters within a tiered (e.g., leveling) structure, where the access counters indicate quantities of access operations in each of multiple different levels of memory regions. For example, the memory system may maintain a first counter that indicates a quantity of access operations at a first memory region (e.g., a first level) corresponding to a first size (e.g., 1 gigabyte (GB)). The memory system 110 may determine that the first counter satisfies a threshold, and the memory system 110 may initiate (e.g., open) a second set of counters that indicate respective quantities of access operations in respective subsets of the first memory region. That is, the second set of counters may each correspond to second memory regions (e.g., of a second level) corresponding to a second size (e.g., 256 megabyte (MB)) that is less than the first size, and each of the second memory regions may be a subset of the first memory region. By maintaining access counters in accordance with the tiered structure described herein, the memory system 110 may perform separation of hot and cold data with increased accuracy and increased precision (e.g., at smaller granularities of data), which may result in reduced latencies, increased throughput, and a reduced WAF.

The system 100 may include any quantity of non-transitory computer readable media that support cold and hot region detection. For example, the host system 105 (e.g., a host system controller 106), the memory system 110 (e.g., a memory system controller 115), or a memory device 130 (e.g., a local controller 135), or any combination thereof may include or otherwise may access one or more non-transitory computer readable media storing instructions (e.g., firmware, logic, code) for performing the functions ascribed herein to the host system 105, the memory system 110, or the memory device 130, or combination thereof. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
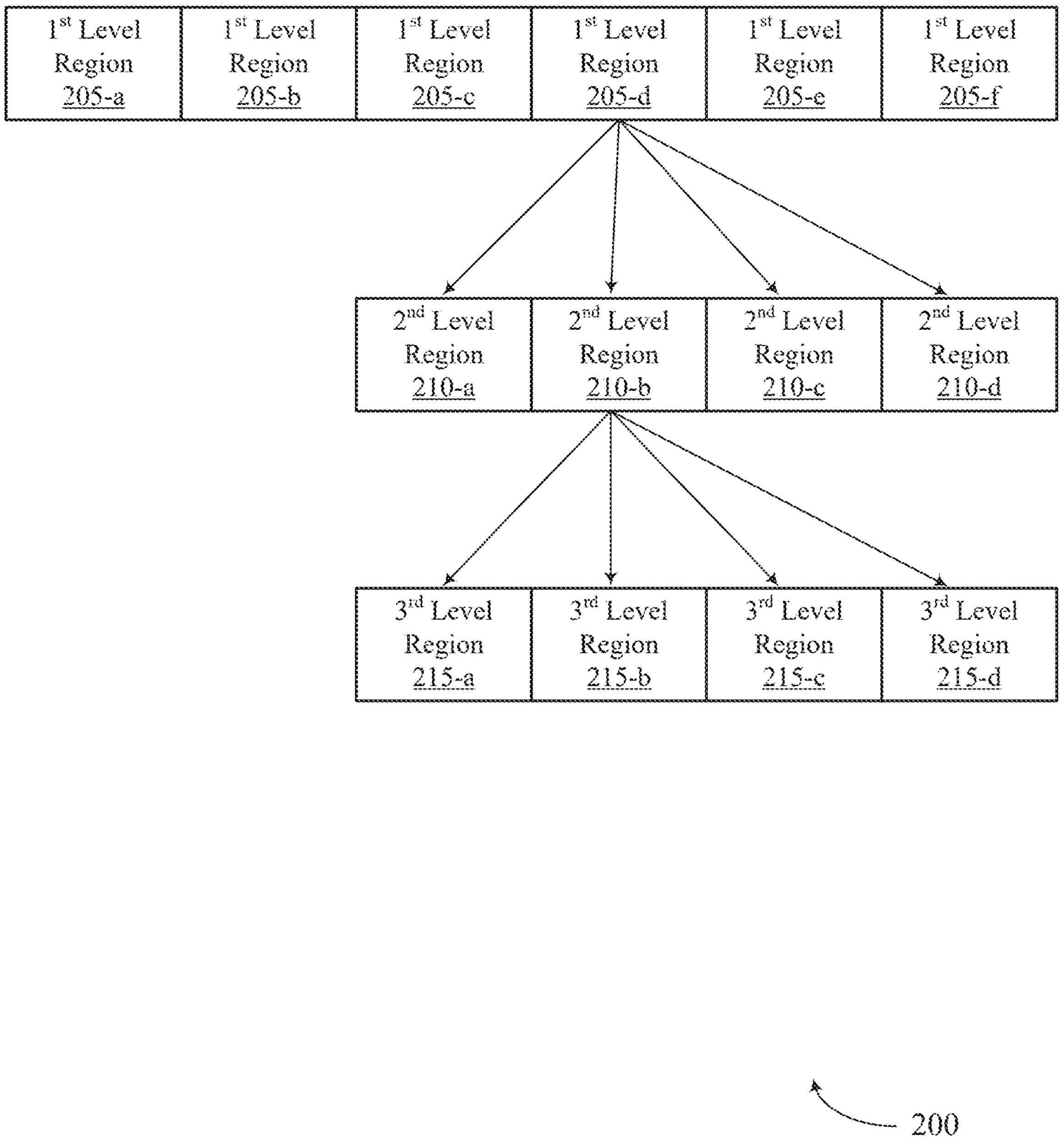
FIG. 2 shows an example of an architecture that supports cold and hot region detection in accordance with examples as disclosed herein.

FIG. 2 shows an example of an architecture 200 that supports cold and hot region detection in accordance with examples as disclosed herein. The architecture 200 may implement or may be implemented by aspects of the system 100. For example, the architecture 200 may include first-level memory regions 205, second-level memory regions 210, and 3rd-level memory regions 215, which may be memory regions within a memory system 110 (e.g., memory devices 130), as described with reference to FIG. 1.

A memory system 110 (e.g., memory devices 130) may include a set of first-level memory regions 205 (e.g., which may correspond to one or more virtual blocks of an L2P table or other L2P data structure). The set of first-level memory regions 205 may include a first-level memory region 205-*a*, a first-level memory region 205-*b*, a first-level memory region 205-*c*, a first-level memory region 205-*d*, a first-level memory region 205-*e*, and a first-level memory region 205-*f*, among other first-level memory regions 205. Each first-level memory region 205 may have a first size (e.g., 1 GB). Each first-level memory region 205 may include a set of second-level memory regions 210. For example, the first-level memory region 205-*d* may include four second-level memory regions 210: a second-level memory region 210-*a*, a second-level memory region 210-*b*, a second-level memory region 210-*c*, and a second-level memory region 210-*d*. Each second-level memory region 210 may have a second size (e.g., 256 megabyte (MB)) less than the first size. Each second-level memory region 210 may include a set of third-level memory regions 215. For example, the second-level memory region 210-*b* may include four third-level memory regions 215: a third-level memory region 215-*a*, a third-level memory region 215-*b*, a third-level memory region 215-*c*, and a third-level memory region 215-*d*. Each third-level memory region may have a third size (e.g., 64 MB) less than the first size and the second size.

The three levels of memory regions in the architecture 200 is given as an example. However, it is to be understood that the architecture 200 may include any quantity of levels. In some examples, the architecture 200 may include less than three levels. In some other examples, the architecture 200 may include greater than three levels. For each additional level added to the architecture 200, each memory region of a respective level (e.g., a fourth level) may be a subset of a memory region of the above level (e.g., a third level) and may correspond to a size smaller than the memory regions of the above level.

The memory system 110 (e.g., a memory system controller 115) may maintain counters (e.g., first-level counters, second-level counters, third-level counters) which indicate a respective quantity of write operations (e.g., based on write commands from a host, such as a host system 105, during an observation duration) for each of the first-level memory regions 305, the second-level memory regions 310, the third-level memory regions 315, or a combination thereof. In some examples, the counters may indicate a respective quantity of read operations (e.g., based on read commands from a host during an observation duration) for each of the first-level memory regions 305, the second-level memory regions 310, the third-level memory regions 315, or a combination thereof. The memory system 110 may utilize the counters to determine which regions of memory are hot (e.g., satisfy a threshold quantity of accesses) and which regions of memory are cold.

In some examples, the memory system 110 (e.g., a memory system controller 115) may store (e.g., and maintain) the counters for the different levels of memory regions in a data array. The data array may be stored in a cache (e.g., SRAM) of the memory system 110 (e.g., a memory system controller 115). The data array may include a set of data elements for each first-level memory region 205 allocated for user data (e.g., n elements, where n is the size of a corresponding first-level memory region in GB), and each data element may include information pertaining to the first-level counter, the second-level counters, and/or the third-level counters for memory within the respective first-level memory region 205 (e.g., in accordance with Table 1). A determination of which first-level memory region 205 the information of each data element applies to may be based on a position (e.g., an address) of the data element within the data array in the cache. The data element shown in Table 1 may include two bits which may be reserved (e.g., for future use). The data element may include two bits to indicate a current level (e.g., a ZIP flag) for which the access counters in the data element pertain to. That is, the current level indication may indicate whether the access counters stored in the data element indicate access information for a first-level memory region 205, for a set of second-level memory regions 210, or for a set of third-level memory regions 215. The data element may include 2 bytes of memory allocated to maintain each of a set of access counters (e.g., four counters of 16 bits each) which indicate a quantity of access operations (e.g., write, read) for each of a set of memory regions.

The memory system 110 (e.g., a memory system controller 115) may track (e.g., using a first-level counter) the quantity of access operations for a first-level memory region 205 using the access counter for offset 0 (e.g., and access counters for other offsets may go unused). In response to the quantity of access operations for the first-level memory region satisfying a threshold, the memory system 110 may overwrite the first-level counter in the data array with a set of second-level counters which indicate a quantity of access operations for each of a set of second-level memory regions 210. That is, a first second-level counter corresponding to the memory region 210-*a* may overwrite (e.g., may be stored at) the access counter at offset 0, a second second-level counter corresponding to the second-level memory region 210-*b* may be stored at the access counter at offset 1, a third second-level counter corresponding to the second-level memory region 210-*c* may be stored at the access counter at offset 2, and a fourth second-level counter corresponding to the second-level memory region 210-*d* may be stored at the access counter at offset 3. The memory system 110 may determine to track third-level memory regions 215 within a second-level memory region 210 (e.g., based on a second-level counter satisfying a second threshold), and the third-level memory regions 215 may be stored in the data element (e.g., may overwrite the second-level counters) at offsets 0 through 3.

TABLE 1

| 2 bits Reserved | 2 bits Current level (ZIP) | 2 bits Max offset for 2nd level | 2 bits Max offset for 3rd level | 16 bits Access counter - offset 0 | 16 bits Access counter - offset 1 | 16 bits Access counter - offset 2 | 16 bits Access counter - offset 3 |
|---|---|---|---|---|---|---|---|

In some examples, the data element may include an indication of a first offset value (e.g., a size) corresponding to the second-level memory regions 210 and a second offset value (e.g., a size) corresponding to the third-level memory regions 215. The offset values may indicate a size of memory regions within the respective level (e.g., 256 MB, 64 MB) or may indicate an offset (e.g., a maximum offset) between a first memory region of that level (e.g., a second-level memory region 210-*a*) and a last memory region of that level (e.g., a second-level memory region 210-*d*).

Using the counters corresponding to the different levels of memory regions, the memory system 110 (e.g., a memory system controller 115) may perform data transfer to separate hot data and cold data. For example, the memory system 110 may select data for a data transfer operation of data within the memory system 110, and the data selected may be based on a value of a second-level counter corresponding to a second-level memory region 210 satisfying a threshold value. As described in greater detail with reference to FIGS. 3A-3C, the memory system 110 may, in response to the value of the second-level counter satisfying the threshold value, determine that data within the entire first-level memory region (e.g., the first-level memory region 205-*d*) is hot, may determine that data within an entire second-level memory region 210 (e.g., a second-level memory region 210-*b*) is hot, or may determine that data within a third-level memory region (e.g., a third-level memory region 215-*b*) is hot. In some examples, the memory system 110 may transfer data such that cold data (e.g., data that is not determined as hot) is transferred and hot data is held in place. For example, for write operations (e.g., host write), the memory system 110 (e.g., a memory system controller 115) may keep hot data (e.g., memory regions identified as hot) in a separate virtual block and refrain from performing garbage collection of the hot data. Additionally, or alternatively, for read operations (e.g., host read), the memory system 110 (e.g., a memory system controller 115) may keep L2P data (e.g., LBAs) belonging to (e.g., associated with) the hot data (e.g., memory regions identified as hot) in an L2P cache area, which may increase the cache hit rate or L2P hit rate, resulting in faster memory access speeds.

In some examples, a determination of which memory regions (e.g., first-level memory regions 205, second-level memory regions 210, third-level memory regions 215) within the memory system 110 are determined (e.g., labeled, categorized, pinned, rated) as hot may be based on hysteresis mechanisms or historical results. The access counters for the multiple levels of memory regions may be tracked over an observation (e.g., assessment) period, which may correspond to a quantity of access commands (e.g., read commands, write commands) from a host system (e.g., a host system 105). In response to the observation period expiring (e.g., a quantity of commands satisfying a threshold), the memory system 110 (e.g., a memory system controller 115) may perform an evaluation (e.g., a status check) of the access counters and may categorize (e.g., label, determine, pin, rate) each memory region as hot, cold, or warm based on values of the respective access counters.

For example, the memory system 110 may determine that a third-level memory region 215-*b* that is within the second-level memory region 210-*b* (e.g., of the first-level memory region 205-*d*) is hot, and the memory system 110 may categorize the first-level memory region 205-*d*, the second-level memory region 210-*b*, and/or the third-level memory region 215-*b* as hot. In some examples, the memory system 110 may determine that an access counter (e.g., a first-level counter) for a first-level memory region 205-*c* has satisfied a first threshold value and that the access counters (e.g., in the data element) for the first-level memory region 205-*c* correspond to second-level memory regions 210 within the first-level memory region 205-*c* (e.g., that second-level access counters have been opened). The memory system 110 may categorize the first-level memory region 205-*c* and/or the second-level memory regions 210 as warm based on the first-level counter for the first-level memory region 205-*c* satisfying a first threshold value and each of the second-level counters corresponding to the second-level memory regions 210 falling below a second threshold value. The memory system 110 may determine that an access counter for a first-level memory region 205-*e* falls below a first threshold value, and the memory system may categorize the first-level memory region 205-*e* as cold.

In some examples, categorization of a memory region (e.g., a first-level memory region 205, a second-level memory region 210, a third-level memory region 215) as hot, cold, or warm may be based on a determination of the memory region as hot, cold, or warm over a quantity of observation periods. For example, a memory region may be categorized as hot (e.g., may switch from a cold designation to a hot designation) based on the memory region being determined hot over a threshold quantity of consecutive observation periods (e.g., M consecutive observation periods). Additionally, or alternatively, a memory region that is categorized as hot may be re-categorized as cold (e.g., may switch from a hot designation to a cold designation, a determination of hot data may be reverted) based on the memory region being determined cold over a threshold quantity of consecutive observation periods (e.g., N consecutive observation periods).

FIG. 3 shows an example of an architecture 300, an architecture 301, and an architecture 302 that support cold and hot region detection in accordance with examples as disclosed herein. For example, the architecture 300 may include first-level memory regions 305, second-level memory regions 310, and 3rd-level memory regions 315, which may be memory regions within a memory system 110 (e.g., memory devices 130), as described with reference to FIG. 1. In some examples, various steps that the memory system 110 may perform with respect to the architecture 300, the architecture 301, and the architecture 302 may be implemented in instructions or firmware stored on memory of the memory system 110 (e.g., memory devices 130) and may be executed by the memory system controller 115 (and/or a local controller 135).

A memory system 110 (e.g., a memory system controller 115) may perform a first set of write operations (e.g., based on a first set of write commands from a host system 105, during one or more observation periods) for a first set of addresses associated with a first-level memory region 305. The memory system 110 may adjust (e.g., increment) a first-level counter for each write operation of the first set of write operations. The first-level counter may indicate a first quantity of write operations associated with the first-level memory region. The memory system 110 may store a data array (e.g., as described in greater detail with reference to FIG. 2) that includes the first-level counter and a level indicator (e.g., a ZIP flag) indicating that the data array includes the first-level counter (e.g., as opposed to second-level counters or third-level counters, which may replace the first-level counter in the data array).

The memory system 110 (e.g., a memory system controller 115) may perform a second set of write operations (e.g., based on a second set of write commands from a host system 105, during one or more observation periods) for a second set of addresses associated with the first-level memory region 305. The memory system 110 may perform the second set of write operations after a value of the first-level counter satisfies a first threshold value. The memory system 110 may adjust, based on (e.g., in response to) the value of the first-level counter satisfying the first threshold value, a set of second-level counters associated with a set of second-level memory regions 310 (e.g., a second-level memory region 310-*a*, a second-level memory region 310-*b*, a second-level memory region 310-*c*, and a second-level memory region 310-*d*). For example, the memory system 110 may overwrite (e.g., replace) the first-level counter in the data array with the set of second-level counters, and the memory system 110 may update the level indicator (e.g., the ZIP flag) to indicate that the data array includes the set of second-level counters. Each second-level counter may indicate a respective quantity of write operations associated with a respective second-level memory region 310.

The memory system 110 (e.g., a memory system controller 115) may calculate, based on a value of a first second-level counter (e.g., corresponding to a second-level memory region 310-*a*) satisfying a second threshold value, a spread value that indicates a distribution of the second set of write operations over the set of second-level memory regions based on respective values of the set of second-level counters. For example, the memory system 110 may calculate the spread value according to Equation 1.

$$\text{SPREAD} = \frac{AVG(cnt)}{\text{MAX}(cnt)} \quad (1)$$

In equation 1, AVG(cnt) may be an average quantity of accesses over the set of second-level counters and MAX (cnt) may be the quantity of accesses corresponding to the second-level counter with the highest quantity of accesses.

Figure 3A:
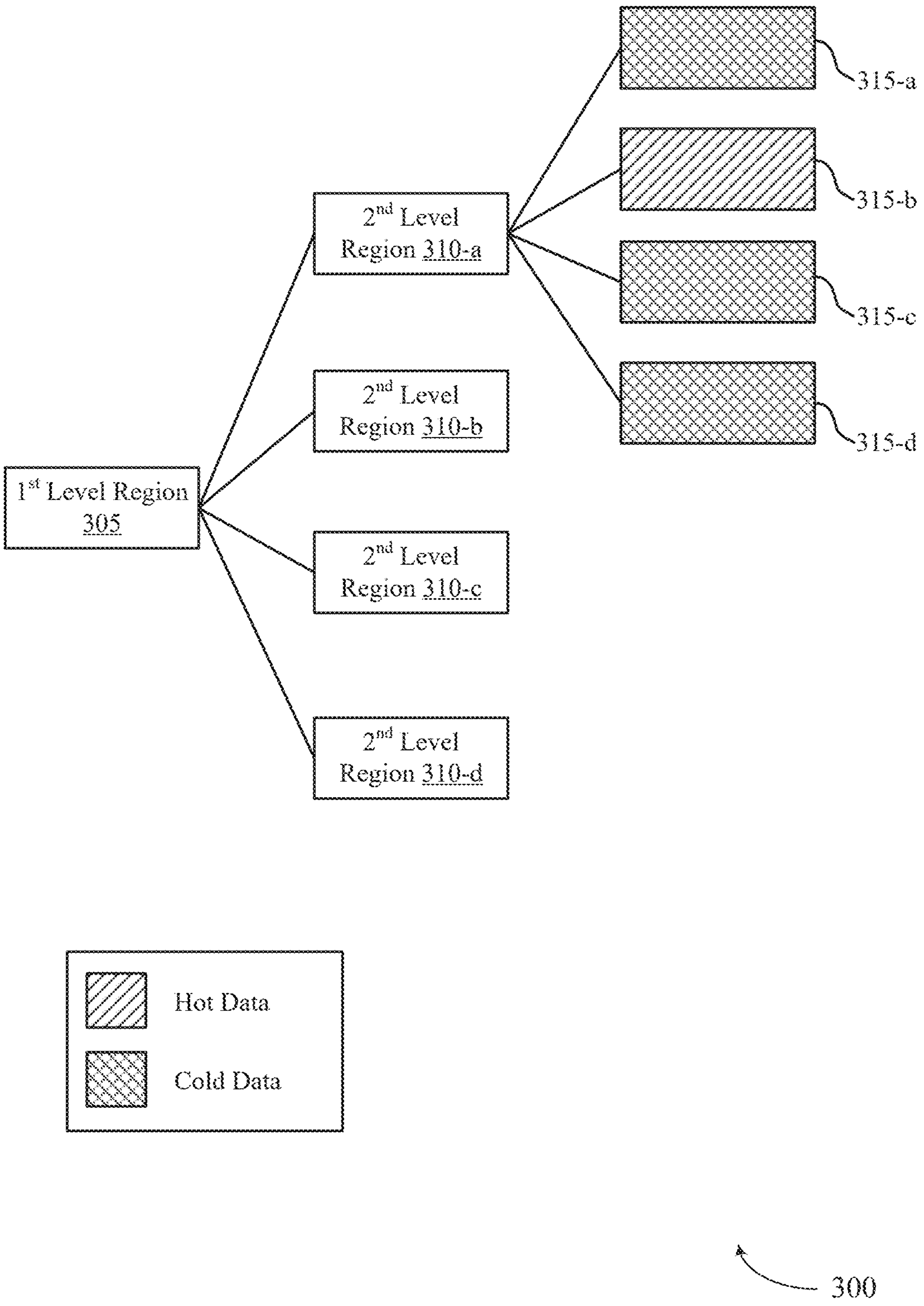
FIGS. 3A-3C show examples of architectures that support cold and hot region detection in accordance with examples as disclosed herein.
Figure 3B:
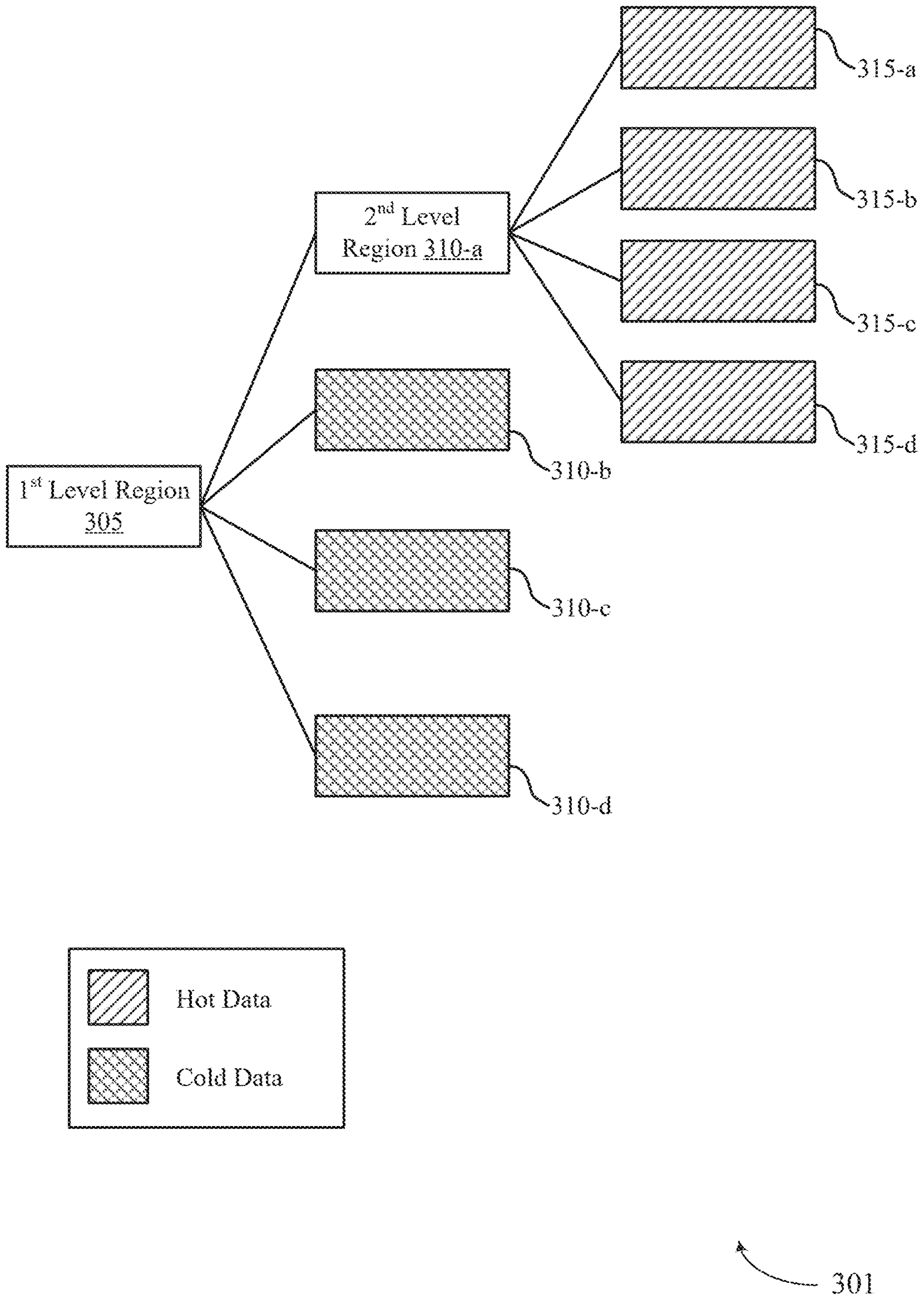
Figure 3C:
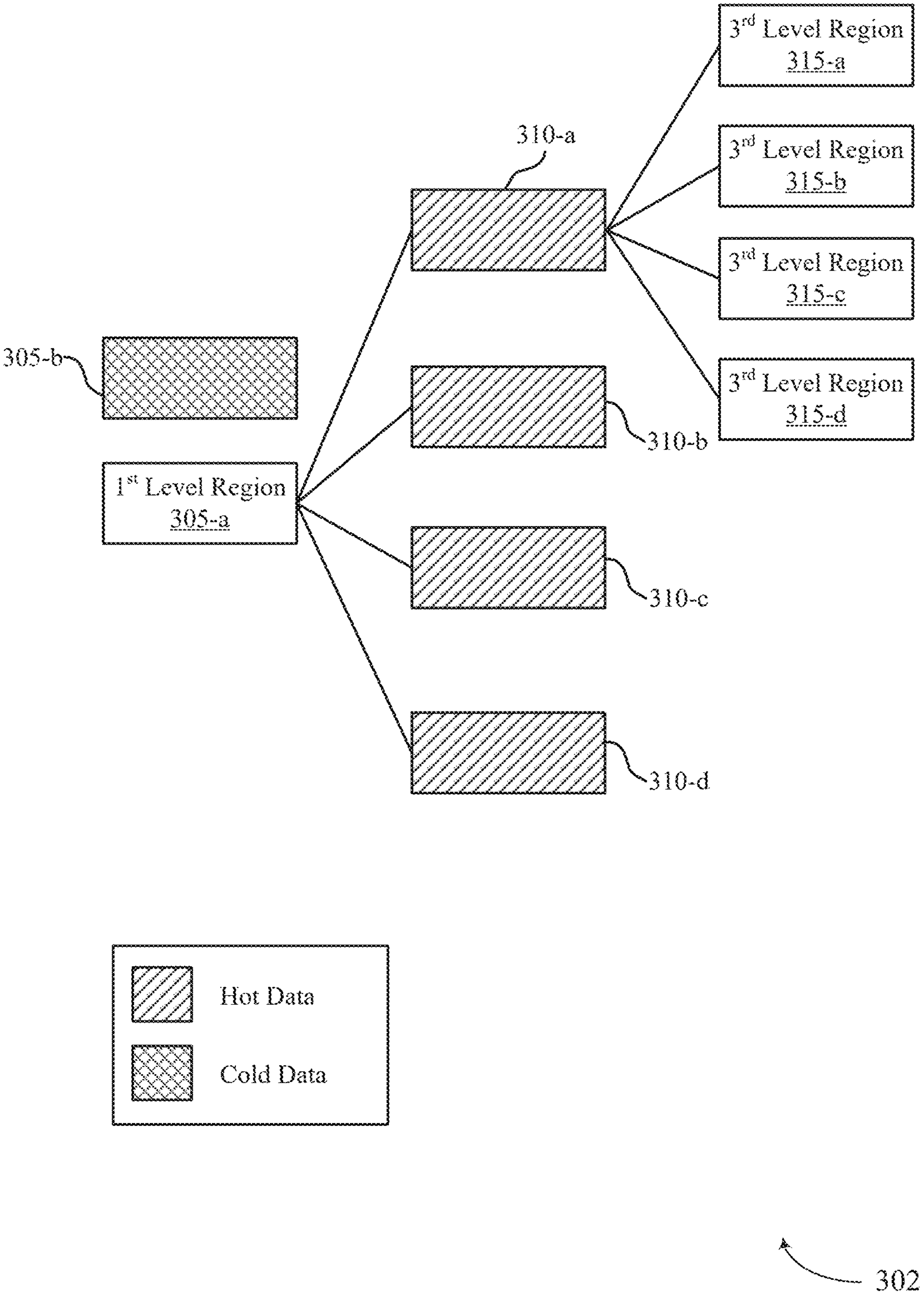

In FIG. 3C, the spread value may exceed the third threshold value (e.g., a threshold percentage), which may indicate that access in the second-level memory regions 310 is not polarized into one second-level memory region 310 (e.g., that the access is relatively evenly distributed). In response to the spread value exceeding the third threshold value, the memory system 110 (e.g., a memory system controller 115) may categorize (e.g., label, determine, pin, rate) the first-level memory region 305-*a* (e.g., and the set of second-level memory regions 310 within the second-level memory region 310-*a*) as hot data. The memory system 110 may select data to transfer for a data transfer operation (e.g., garbage collection) of data within the memory system 110 based on the categorization of the memory regions. For example, the memory system 110 may transfer data from memory regions outside of the first-level memory region 305-*a* (e.g., from the first-level memory region 305-*b*) and may refrain from transferring (e.g., exclude from selection) data from the first-level memory region 305-*a* labeled as hot.

In FIGS. 3A and 3B, the spread value may fall below a third threshold value, which may indicate that access in the second-level memory regions 310 is polarized (e.g., weighted) toward one second-level memory region 310-*a*. In response to the spread value falling below the third threshold value, the memory system 110 (e.g., a memory system controller 115) may overwrite (e.g., replace) the set of second-level counters in the data array with a set of third-level counters, and the memory system 110 may update the level indicator (e.g., the ZIP flag) to indicate that the data array includes the set of third-level counters. Each third-level counter may indicate a respective quantity of write operations associated with a respective third-level memory region 315 (e.g., a third-level memory region 315-*a*, a third-level memory region 315-*b*, a third-level memory region 315-*c*, and a third-level memory region 315-*d*) that is within the second-level memory region 310-*a*.

The memory system 110 (e.g., a memory system controller 115) may perform a third set of write operations (e.g., based on a third set of write commands from a host system 105, during one or more observation periods) for a third set of addresses associated with the first-level memory region 305. The memory system 110 may perform the third set of write operations after the value of the first second-level counter satisfies the second threshold value. The memory system 110 may adjust the set of third-level counters based on (e.g., in response to) the value of the first second-level counter satisfying the second threshold value and based on (e.g., in response to) overwriting the set of second-level counters in the data array with the set of third-level counters.

The memory system 110 (e.g., a memory system controller 115) may calculate, based on a value of a first third-level counter (e.g., corresponding to a third-level memory region 315-*b*) satisfying a third threshold value, a second spread value (e.g., according to Equation 1) that indicates a distribution of the third set of write operations over the set of third-level memory regions based on respective values of the set of third-level counters.

In FIG. 3A, the spread value may fall below a fourth threshold value (e.g., a threshold percentage), which may indicate that access in the third-level memory regions 315 is polarized (e.g., weighted) toward one third-level memory region 315-*b*. In response to the spread value falling below the fourth threshold value, the memory system 110 (e.g., a memory system controller 115) may categorize (e.g., label, determine, pin, rate) the third-level memory region 315-*b* as hot data and may categorize the third-level memory region 315-*a*, the third-level memory region 315-*c*, the third-level memory region 315-*d*, or a combination thereof, as cold data. The memory system 110 may select data to transfer for a data transfer operation (e.g., garbage collection) of data within the memory system 110 based on the categorization of the memory regions. For example, the memory system 110 may transfer data from memory regions labeled as cold (the third-level memory region 315-*a*, the third-level memory region 315-*c*, the third-level memory region 315-*d*) and may refrain from transferring (e.g., exclude from selection) data from the third-level memory region 315-*b* labeled as hot.

In FIG. 3B, the spread value may exceed the fourth threshold value, which may indicate that access in the third-level memory regions 315 is not polarized into one third-level memory region 315 (e.g., that the access is relatively evenly distributed). In response to the spread value exceeding the fourth threshold value, the memory system 110 (e.g., a memory system controller 115) may categorize (e.g., label, determine, pin, rate) the second-level memory region 310-*a* (e.g., and the set of third-level memory regions 315 within the second-level memory region 310-*a*) as hot data and may categorize the second-level memory region 310-*b*, the second-level memory region 310-*c*, the second-level memory region 310-*d*, or a combination thereof, as cold data. The memory system 110 may select data to transfer for a data transfer operation (e.g., garbage collection) of data within the memory system 110 based on the categorization of the memory regions. For example, the memory system 110 may transfer data from memory regions labeled as cold (the second-level memory region 310-*b*, the second-level memory region 310-*c*, the second-level memory region 310-*d*) and may refrain from transferring (e.g., exclude from selection) data from the second-level memory region 310-*a* labeled as hot.

Figure 4:
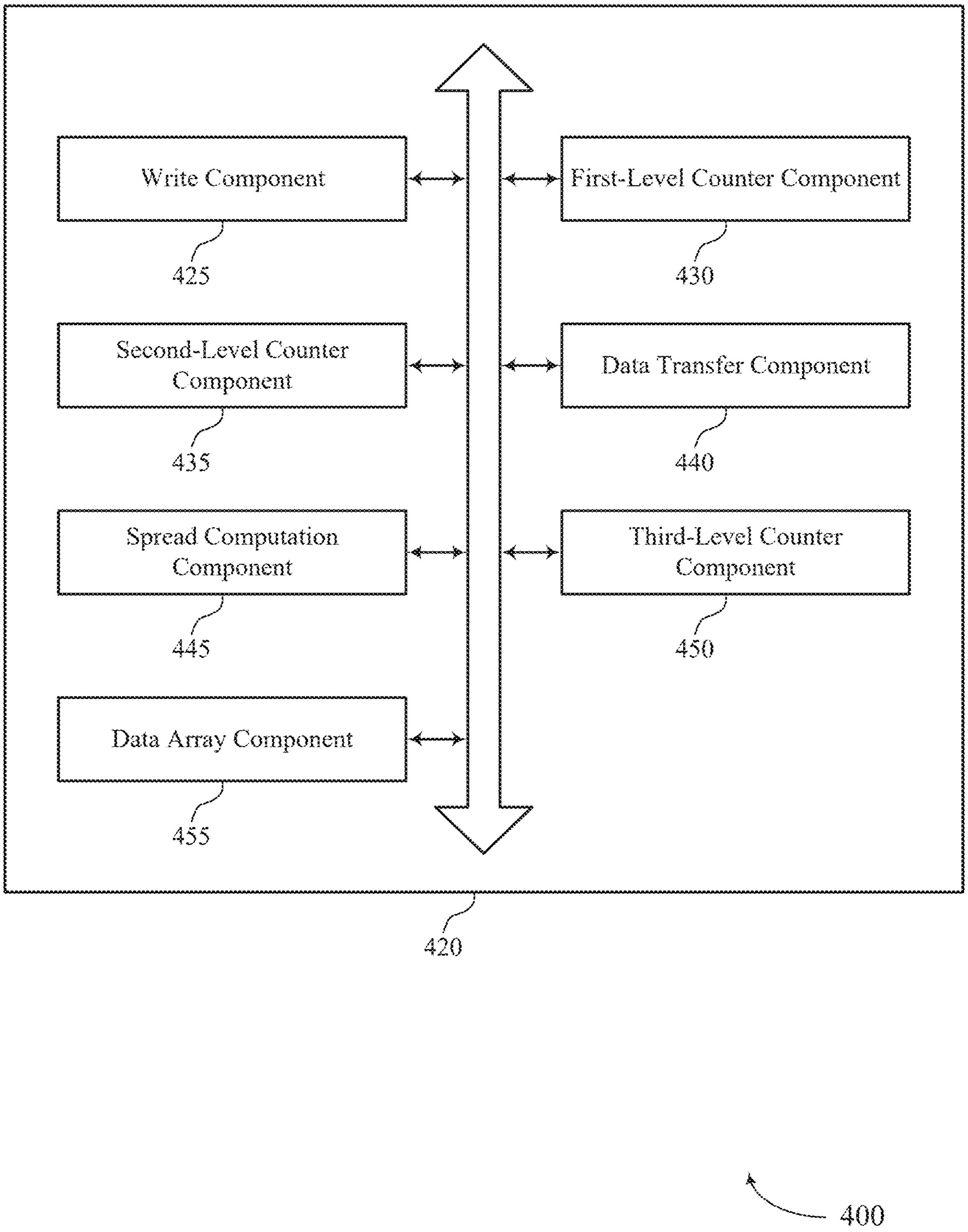
FIG. 4 shows a block diagram of a memory system that supports cold and hot region detection in accordance with examples as disclosed herein.

FIG. 4 shows a block diagram 400 of a memory system 420 that supports cold and hot region detection in accordance with examples as disclosed herein. The memory system 420 may be an example of aspects of a memory system as described with reference to FIGS. 1 through 3. The memory system 420, or various components thereof, may be an example of means for performing various aspects of cold and hot region detection as described herein. For example, the memory system 420 may include a write component 425, a first-level counter component 430, a second-level counter component 435, a data transfer component 440, a spread computation component 445, a third-level counter component 450, a data array component 455, or any combination thereof. Each of these components, or components of subcomponents thereof (e.g., one or more processors, one or more memories), may communicate, directly or indirectly, with one another (e.g., via one or more buses).

The write component 425 may be configured as or otherwise support a means for performing a first set of write operations for a first set of addresses associated with a first-level memory region having a first size. The first-level counter component 430 may be configured as or otherwise support a means for adjusting a first-level counter for each write operation of the first set of write operations, where the first-level counter indicates a first quantity of write operations associated with the first-level memory region. In some examples, the write component 425 may be configured as or otherwise support a means for performing, after a value of the first-level counter satisfies a first threshold value, a second set of write operations for a second set of addresses associated with the first-level memory region. The second-level counter component 435 may be configured as or otherwise support a means for adjusting, in accordance with the value of the first-level counter satisfying the first threshold value, a set of second-level counters associated with a set of second-level memory regions, where each second-level memory region is within the first-level memory region and has a second size smaller than the first size, and where each second-level counter of the set of second-level counters indicates a respective quantity of write operations associated with a respective second-level memory region of the set of second-level memory regions. The data transfer component 440 may be configured as or otherwise support a means for selecting, for a data transfer operation of data within the memory system, data to transfer in accordance with a value of a first second-level counter of the set of second-level counters satisfying a second threshold value, where the first second-level counter is associated with a first second-level memory region of the set of second-level memory regions.

In some examples, to support selecting the data to transfer, the spread computation component 445 may be configured as or otherwise support a means for calculating, in accordance with the value of the first second-level counter satisfying the second threshold value, a spread value that indicates a distribution of the second set of write operations over the set of second-level memory regions using respective values of the set of second-level counters; and. In some examples, to support selecting the data to transfer, the data transfer component 440 may be configured as or otherwise support a means for selecting the data from outside of the first-level memory region in accordance with the spread value satisfying a third threshold value.

In some examples, the write component 425 may be configured as or otherwise support a means for performing, after the value of the first second-level counter satisfies the second threshold value, a third set of write operations for a third set of addresses associated with the first-level memory region. In some examples, the third-level counter component 450 may be configured as or otherwise support a means for adjusting, in accordance with the value of the first second-level counter satisfying the second threshold value, a set of third-level counters associated with a set of third-level memory regions, where: each third-level memory region is within the first second-level memory region associated with the first second-level counter and has a third size smaller than the second size and the first size; and each third-level counter of the set of third-level counters indicates a respective quantity of write operations associated with a respective third-level memory region of the set of third-level memory regions.

In some examples, the spread computation component 445 may be configured as or otherwise support a means for calculating, in accordance with the value of the first second-level counter satisfying the second threshold value, a spread value that indicates a distribution of the second set of write operations over the set of second-level memory regions using respective values of the set of second-level counters. In some examples, the third-level counter component 450 may be configured as or otherwise support a means for adjusting the set of third-level counters associated with the set of third-level memory regions in accordance with the spread value satisfying a third threshold value.

In some examples, the spread computation component 445 may be configured as or otherwise support a means for calculating, in accordance with a value of a first third-level counter of the set of third-level counters satisfying a third threshold value, a spread value that indicates a distribution of the third set of write operations over the set of third-level memory regions using respective values of the set of third-level counters, where the first third-level counter is associated with a first third-level memory region of the set of third-level memory regions.

In some examples, to support selecting the data to transfer, the data transfer component 440 may be configured as or otherwise support a means for selecting the data to include a subset of third-level memory regions of the set of third-level memory regions, the subset excluding the first third-level memory region, in accordance with the spread value satisfying a fourth threshold value.

In some examples, to support selecting the data to transfer, the data transfer component 440 may be configured as or otherwise support a means for selecting the data to include a subset of second-level memory regions of the set of second-level memory regions, the subset excluding the first second-level memory region, in accordance with the spread value satisfying a fourth threshold value.

In some examples, the data array component 455 may be configured as or otherwise support a means for storing a data array that includes the first-level counter or the set of second-level counters and includes an indicator of whether the data array includes the first-level counter or the set of second-level counters. In some examples, the second-level counter component 435 may be configured as or otherwise support a means for adjusting the set of second-level counters by overwriting the first-level counter in the data array with the set of second-level counters.

In some examples, the first set of write operations, the second set of write operations, or both, are performed during a quantity of assessment periods, each assessment period of the quantity of assessment periods associated with a quantity of access commands. In some examples, selecting the data to transfer is in accordance with the quantity of assessment periods satisfying a threshold.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
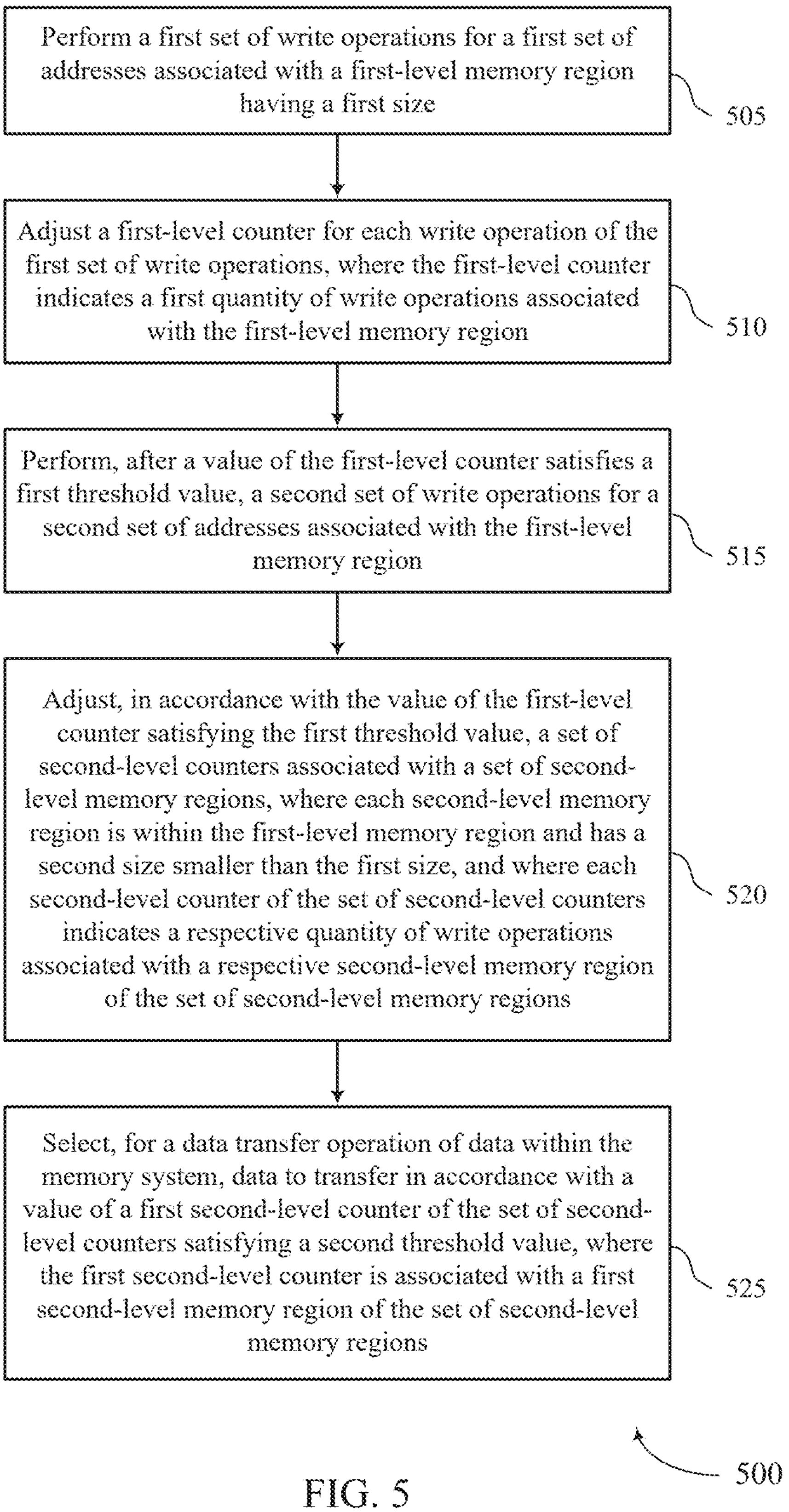
FIG. 5 shows a flowchart illustrating a method or methods that support cold and hot region detection in accordance with examples as disclosed herein.

FIG. 5 shows a flowchart illustrating a method 500 that supports cold and hot region detection in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include performing a first set of write operations for a first set of addresses associated with a first-level memory region having a first size. In some examples, aspects of the operations of 505 may be performed by a write component 425 as described with reference to FIG. 4.

At 510, the method may include adjusting a first-level counter for each write operation of the first set of write operations, where the first-level counter indicates a first quantity of write operations associated with the first-level memory region. In some examples, aspects of the operations of 510 may be performed by a first-level counter component 430 as described with reference to FIG. 4.

At 515, the method may include performing, after a value of the first-level counter satisfies a first threshold value, a second set of write operations for a second set of addresses associated with the first-level memory region. In some examples, aspects of the operations of 515 may be performed by a write component 425 as described with reference to FIG. 4.

At 520, the method may include adjusting, in accordance with the value of the first-level counter satisfying the first threshold value, a set of second-level counters associated with a set of second-level memory regions, where each second-level memory region is within the first-level memory region and has a second size smaller than the first size, and where each second-level counter of the set of second-level counters indicates a respective quantity of write operations associated with a respective second-level memory region of the set of second-level memory regions. In some examples, aspects of the operations of 520 may be performed by a second-level counter component 435 as described with reference to FIG. 4.

At 525, the method may include selecting, for a data transfer operation of data within the memory system, data to transfer in accordance with a value of a first second-level counter of the set of second-level counters satisfying a second threshold value, where the first second-level counter is associated with a first second-level memory region of the set of second-level memory regions. In some examples, aspects of the operations of 525 may be performed by a data transfer component 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing a first set of write operations for a first set of addresses associated with a first-level memory region having a first size; adjusting a first-level counter for each write operation of the first set of write operations, where the first-level counter indicates a first quantity of write operations associated with the first-level memory region; performing, after a value of the first-level counter satisfies a first threshold value, a second set of write operations for a second set of addresses associated with the first-level memory region; adjusting, in accordance with the value of the first-level counter satisfying the first threshold value, a set of second-level counters associated with a set of second-level memory regions, where: each second-level memory region is within the first-level memory region and has a second size smaller than the first size; and each second-level counter of the set of second-level counters indicates a respective quantity of write operations associated with a respective second-level memory region of the set of second-level memory regions; and selecting, for a data transfer operation of data within the memory system, data to transfer in accordance with a value of a first second-level counter of the set of second-level counters satisfying a second threshold value, where the first second-level counter is associated with a first second-level memory region of the set of second-level memory regions.

Aspect 2: The method, apparatus, or non-transitory computer-readable medium of aspect 1, where operations, features, circuitry, logic, means, or instructions, or any combination thereof for selecting the data to transfer includes operations, features, circuitry, logic, means, or instructions, or any combination thereof for calculating, in accordance with the value of the first second-level counter satisfying the second threshold value, a spread value that indicates a distribution of the second set of write operations over the set of second-level memory regions using respective values of the set of second-level counters; and selecting the data from outside of the first-level memory region in accordance with the spread value satisfying a third threshold value.

Aspect 3: The method, apparatus, or non-transitory computer-readable medium of any of aspects 1 through 2, further including operations, features, circuitry, logic, means, or instructions, or any combination thereof for performing, after the value of the first second-level counter satisfies the second threshold value, a third set of write operations for a third set of addresses associated with the first-level memory region and adjusting, in accordance with the value of the first second-level counter satisfying the second threshold value, a set of third-level counters associated with a set of third-level memory regions, where: each third-level memory region is within the first second-level memory region associated with the first second-level counter and has a third size smaller than the second size and the first size; and each third-level counter of the set of third-level counters indicates a respective quantity of write operations associated with a respective third-level memory region of the set of third-level memory regions.

Aspect 4: The method, apparatus, or non-transitory computer-readable medium of aspect 3, further including operations, features, circuitry, logic, means, or instructions, or any combination thereof for calculating, in accordance with the value of the first second-level counter satisfying the second threshold value, a spread value that indicates a distribution of the second set of write operations over the set of second-level memory regions using respective values of the set of second-level counters and where adjusting the set of third-level counters associated with the set of third-level memory regions is in accordance with the spread value satisfying a third threshold value.

Aspect 5: The method, apparatus, or non-transitory computer-readable medium of any of aspects 3 through 4, further including operations, features, circuitry, logic, means, or instructions, or any combination thereof for calculating, in accordance with a value of a first third-level counter of the set of third-level counters satisfying a third threshold value, a spread value that indicates a distribution of the third set of write operations over the set of third-level memory regions using respective values of the set of third-level counters, where the first third-level counter is associated with a first third-level memory region of the set of third-level memory regions.

Aspect 6: The method, apparatus, or non-transitory computer-readable medium of aspect 5, where operations, features, circuitry, logic, means, or instructions, or any combination thereof for selecting the data to transfer includes operations, features, circuitry, logic, means, or instructions, or any combination thereof for selecting the data to include a subset of third-level memory regions of the set of third-level memory regions, the subset excluding the first third-level memory region, in accordance with the spread value satisfying a fourth threshold value.

Aspect 7: The method, apparatus, or non-transitory computer-readable medium of any of aspects 5 through 6, where operations, features, circuitry, logic, means, or instructions, or any combination thereof for selecting the data to transfer includes operations, features, circuitry, logic, means, or instructions, or any combination thereof for selecting the data to include a subset of second-level memory regions of the set of second-level memory regions, the subset excluding the first second-level memory region, in accordance with the spread value satisfying a fourth threshold value.

Aspect 8: The method, apparatus, or non-transitory computer-readable medium of any of aspects 1 through 7, further including operations, features, circuitry, logic, means, or instructions, or any combination thereof for storing a data array that includes the first-level counter or the set of second-level counters and includes an indicator of whether the data array includes the first-level counter or the set of second-level counters and where adjusting the set of second-level counters includes overwriting the first-level counter in the data array with the set of second-level counters.

Aspect 9: The method, apparatus, or non-transitory computer-readable medium of any of aspects 1 through 8, where the first set of write operations, the second set of write operations, or both, are performed during a quantity of assessment periods, each assessment period of the quantity of assessment periods associated with a quantity of access commands and selecting the data to transfer is in accordance with the quantity of assessment periods satisfying a threshold.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms “electronic communication,” “conductive contact,” “connected,” and “coupled” may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term “coupling” (e.g., “electrically coupling”) may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

perform a first set of write operations for a first set of addresses associated with a first-level memory region having a first size;

adjust a first-level counter for each write operation of the first set of write operations, wherein the first-level counter indicates a first quantity of write operations associated with the first-level memory region;

perform, after a value of the first-level counter satisfies a first threshold value, a second set of write operations for a second set of addresses associated with the first-level memory region;

adjust, in accordance with the value of the first-level counter satisfying the first threshold value, a set of second-level counters associated with a set of second-level memory regions, wherein:

each second-level memory region is within the first-level memory region and has a second size smaller than the first size; and each second-level counter of the set of second-level counters indicates a respective quantity of write operations associated with a respective second-level memory region of the set of second-level memory regions; and select, for a data transfer operation of data within the memory system, data to transfer in accordance with a value of a first second-level counter of the set of second-level counters satisfying a second threshold value, wherein the first second-level counter is associated with a first second-level memory region of the set of second-level memory regions.

2. The memory system of claim 1, wherein, to select the data to transfer, the processing circuitry is configured to cause the memory system to:

calculate, in accordance with the value of the first second-level counter satisfying the second threshold value, a spread value that indicates a distribution of the second set of write operations over the set of second-level memory regions using respective values of the set of second-level counters; and select the data from outside of the first-level memory region in accordance with the spread value satisfying a third threshold value.

3. The memory system of claim 1, wherein the processing circuitry is further configured to cause the memory system to:

perform, after the value of the first second-level counter satisfies the second threshold value, a third set of write operations for a third set of addresses associated with the first-level memory region; and adjust, in accordance with the value of the first second-level counter satisfying the second threshold value, a set of third-level counters associated with a set of third-level memory regions, wherein:

each third-level memory region is within the first second-level memory region associated with the first second-level counter and has a third size smaller than the second size and the first size; and each third-level counter of the set of third-level counters indicates a respective quantity of write operations associated with a respective third-level memory region of the set of third-level memory regions.

4. The memory system of claim 3, wherein the processing circuitry is further configured to cause the memory system to:

calculate, in accordance with the value of the first second-level counter satisfying the second threshold value, a spread value that indicates a distribution of the second set of write operations over the set of second-level memory regions using respective values of the set of second-level counters, wherein the processing circuitry is configured to cause the memory system to adjust the set of third-level counters associated with the set of third-level memory regions in accordance with the spread value satisfying a third threshold value.

5. The memory system of claim 3, wherein the processing circuitry is further configured to cause the memory system to:

calculate, in accordance with a value of a first third-level counter of the set of third-level counters satisfying a third threshold value, a spread value that indicates a distribution of the third set of write operations over the set of third-level memory regions using respective values of the set of third-level counters, wherein the first third-level counter is associated with a first third-level memory region of the set of third-level memory regions.

6. The memory system of claim 5, wherein, to select the data to transfer, the processing circuitry is configured to cause the memory system to:

select the data to include a subset of third-level memory regions of the set of third-level memory regions, the subset excluding the first third-level memory region, in accordance with the spread value satisfying a fourth threshold value.

7. The memory system of claim 5, wherein, to selecting the data to transfer, the processing circuitry is configured to cause the memory system to:

select the data to include a subset of second-level memory regions of the set of second-level memory regions, the subset excluding the first second-level memory region, in accordance with the spread value satisfying a fourth threshold value.

8. The memory system of claim 1, wherein the processing circuitry is further configured to cause the memory system to:

store a data array that comprises the first-level counter or the set of second-level counters and comprises an indicator of whether the data array comprises the first-level counter or the set of second-level counters, wherein, to adjust the set of second-level counters, the processing circuitry is configured to cause the memory system to overwrite the first-level counter in the data array with the set of second-level counters.

9. The memory system of claim 1, wherein the processing circuitry is configured to cause the memory system to:

perform the first set of write operations, the second set of write operations, or both during a quantity of assessment periods, each assessment period of the quantity of assessment periods associated with a quantity of access commands; and select the data to transfer in accordance with the quantity of assessment periods satisfying a threshold.

10. A non-transitory computer-readable medium storing code comprising instructions which, when executed by one or more processors of a memory system, cause the memory system to:

perform a first set of write operations for a first set of addresses associated with a first-level memory region having a first size;

adjust a first-level counter for each write operation of the first set of write operations, wherein the first-level counter indicates a first quantity of write operations associated with the first-level memory region;

perform, after a value of the first-level counter satisfies a first threshold value, a second set of write operations for a second set of addresses associated with the first-level memory region;

adjust, in accordance with the value of the first-level counter satisfying the first threshold value, a set of second-level counters associated with a set of second-level memory regions, wherein:

each second-level memory region is within the first-level memory region and has a second size smaller than the first size; and each second-level counter of the set of second-level counters indicates a respective quantity of write operations associated with a respective second-level memory region of the set of second-level memory regions; and select, for a data transfer operation of data within the memory system, data to transfer in accordance with a value of a first second-level counter of the set of second-level counters satisfying a second threshold value, wherein the first second-level counter is associated with a first second-level memory region of the set of second-level memory regions.

11. The non-transitory computer-readable medium of claim 10, wherein, to select the data, the instructions, when executed by the one or more processors of the memory system, cause the memory system to:

calculate, in accordance with the value of the first second-level counter satisfying the second threshold value, a spread value that indicates a distribution of the second set of write operations over the set of second-level memory regions using respective values of the set of second-level counters; and select the data from outside of the first-level memory region in accordance with the spread value satisfying a third threshold value.

12. The non-transitory computer-readable medium of claim 10, wherein the instructions, when executed by the one or more processors of the memory system, further cause the memory system to:

perform, after the value of the first second-level counter satisfies the second threshold value, a third set of write operations for a third set of addresses associated with the first-level memory region; and adjust, in accordance with the value of the first second-level counter satisfying the second threshold value, a set of third-level counters associated with a set of third-level memory regions, wherein:

each third-level memory region is within the first second-level memory region associated with the first second-level counter and has a third size smaller than the second size and the first size; and each third-level counter of the set of third-level counters indicates a respective quantity of write operations associated with a respective third-level memory region of the set of third-level memory regions.

13. The non-transitory computer-readable medium of claim 12, wherein the instructions, when executed by the one or more processors of the memory system, further cause the memory system to:

calculate, in accordance with the value of the first second-level counter satisfying the second threshold value, a spread value that indicates a distribution of the second set of write operations over the set of second-level memory regions using respective values of the set of second-level counters, the instructions, when executed by the one or more processors of the memory system, cause the memory system to adjust the set of third-level counters associated with the set of third-level memory regions in accordance with the spread value satisfying a third threshold value.

14. The non-transitory computer-readable medium of claim 12, wherein the instructions, when executed by the one or more processors of the memory system, further cause the memory system to:

calculate, in accordance with a value of a first third-level counter of the set of third-level counters satisfying a third threshold value, a spread value that indicates a distribution of the third set of write operations over the set of third-level memory regions using respective values of the set of third-level counters, wherein the first third-level counter is associated with a first third-level memory region of the set of third-level memory regions.

15. The non-transitory computer-readable medium of claim 14, wherein, to select the data, the instructions, when executed by the one or more processors of the memory system, cause the memory system to:

select the data to include a subset of third-level memory regions of the set of third-level memory regions, the subset excluding the first third-level memory region, in accordance with the spread value satisfying a fourth threshold value.

16. The non-transitory computer-readable medium of claim 14, wherein, to select the data, the instructions, when executed by the one or more processors of the memory system, cause the memory system to:

select the data to include a subset of second-level memory regions of the set of second-level memory regions, the subset excluding the first second-level memory region, in accordance with the spread value satisfying a fourth threshold value.

17. The non-transitory computer-readable medium of claim 10, wherein the instructions, when executed by the one or more processors of the memory system, further cause the memory system to:

store a data array that comprises the first-level counter or the set of second-level counters and comprises an indicator of whether the data array comprises the first-level counter or the set of second-level counters, wherein, to adjust the set of second-level counters, the instructions, when executed by the one or more processors of the memory system, cause the memory system to overwrite the first-level counter in the data array with the set of second-level counters.

18. The non-transitory computer-readable medium of claim 10, wherein the instructions, when executed by the one or more processors of the memory system, further cause the memory system to:

perform the first set of write operations, the second set of write operations, or both during a quantity of assessment periods, each assessment period of the quantity of assessment periods associated with a quantity of access commands; and select the data to transfer in accordance with the quantity of assessment periods satisfying a threshold.

19. A method by a memory system, comprising:

performing a first set of write operations for a first set of addresses associated with a first-level memory region having a first size;

adjusting a first-level counter for each write operation of the first set of write operations, wherein the first-level counter indicates a first quantity of write operations associated with the first-level memory region;

performing, after a value of the first-level counter satisfies a first threshold value, a second set of write operations for a second set of addresses associated with the first-level memory region;

adjusting, in accordance with the value of the first-level counter satisfying the first threshold value, a set of second-level counters associated with a set of second-level memory regions, wherein:

each second-level memory region is within the first-level memory region and has a second size smaller than the first size; and each second-level counter of the set of second-level counters indicates a respective quantity of write operations associated with a respective second-level memory region of the set of second-level memory regions; and selecting, for a data transfer operation of data within the memory system, data to transfer in accordance with a value of a first second-level counter of the set of second-level counters satisfying a second threshold value, wherein the first second-level counter is associated with a first second-level memory region of the set of second-level memory regions.

20. The method of claim 19, wherein selecting the data to transfer comprises:

calculating, in accordance with the value of the first second-level counter satisfying the second threshold value, a spread value that indicates a distribution of the second set of write operations over the set of second-level memory regions using respective values of the set of second-level counters; and selecting the data from outside of the first-level memory region in accordance with the spread value satisfying a third threshold value.

21. The method of claim 19, further comprising:

performing, after the value of the first second-level counter satisfies the second threshold value, a third set of write operations for a third set of addresses associated with the first-level memory region; and adjusting, in accordance with the value of the first second-level counter satisfying the second threshold value, a set of third-level counters associated with a set of third-level memory regions, wherein:

each third-level memory region is within the first second-level memory region associated with the first second-level counter and has a third size smaller than the second size and the first size; and each third-level counter of the set of third-level counters indicates a respective quantity of write operations associated with a respective third-level memory region of the set of third-level memory regions.

22. The method of claim 21, further comprising:

calculating, in accordance with the value of the first second-level counter satisfying the second threshold value, a spread value that indicates a distribution of the second set of write operations over the set of second-level memory regions using respective values of the set of second-level counters, wherein adjusting the set of third-level counters associated with the set of third-level memory regions is in accordance with the spread value satisfying a third threshold value.

* * * * *